Jan. 6, 1959    G. A. KENDALL ET AL    2,867,138
CENTER DRIVE BORING MACHINE
Filed May 21, 1953    5 Sheets-Sheet 1
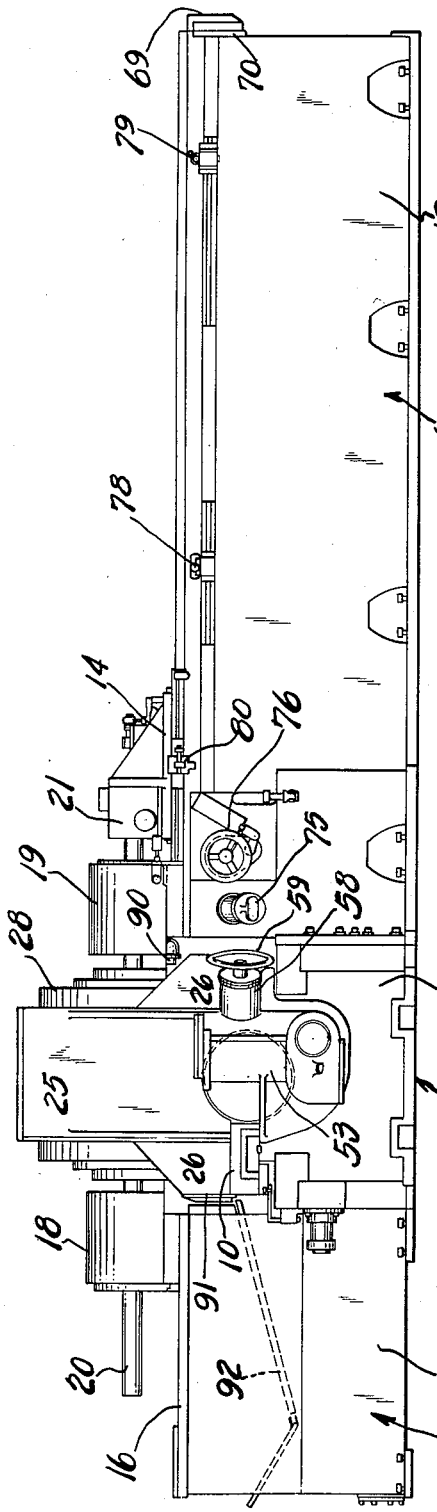
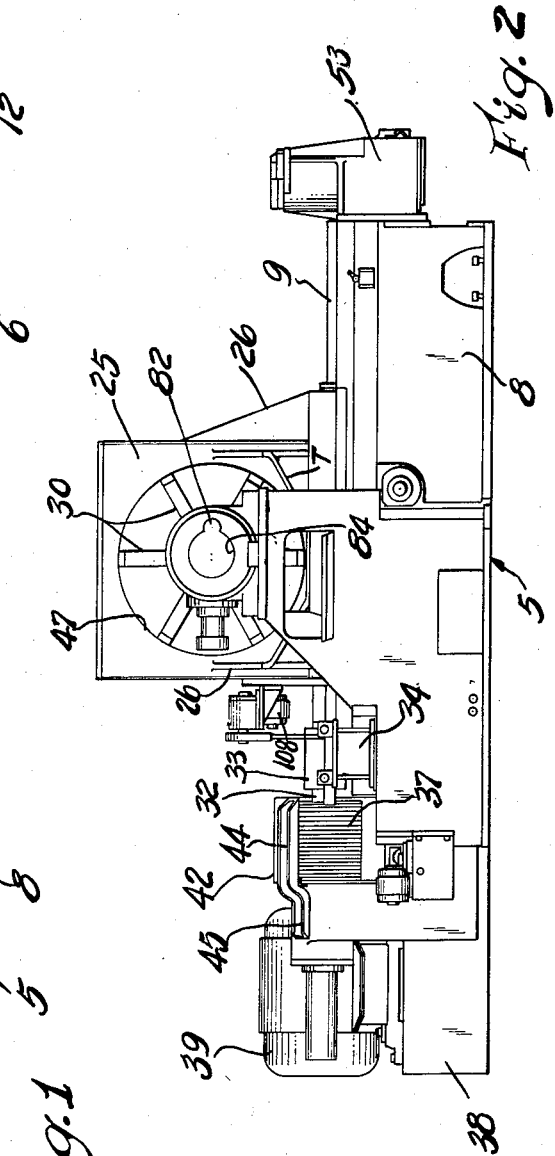
INVENTORS
George A. Kendall.
James S. Ross.
By Learman & Learman
ATTORNEYS Jan. 6, 1959
G. A. KENDALL ET AL
2,867,138
CENTER DRIVE BORING MACHINE
Filed May 21, 1953
5 Sheets-Sheet 2
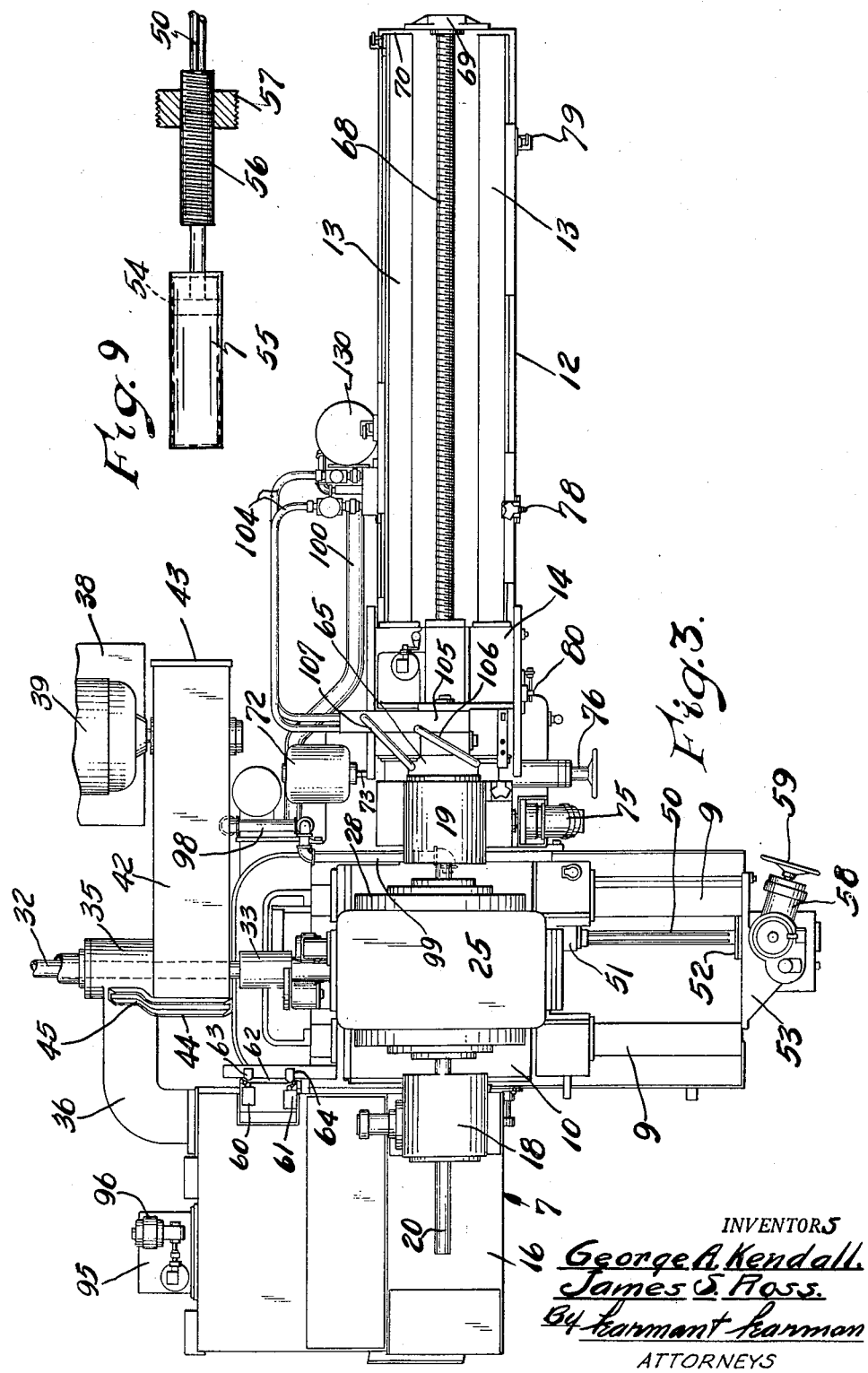
INVENTORS
George A. Kendall,
James S. Ross.
By Fearman & Fearman
ATTORNEYS

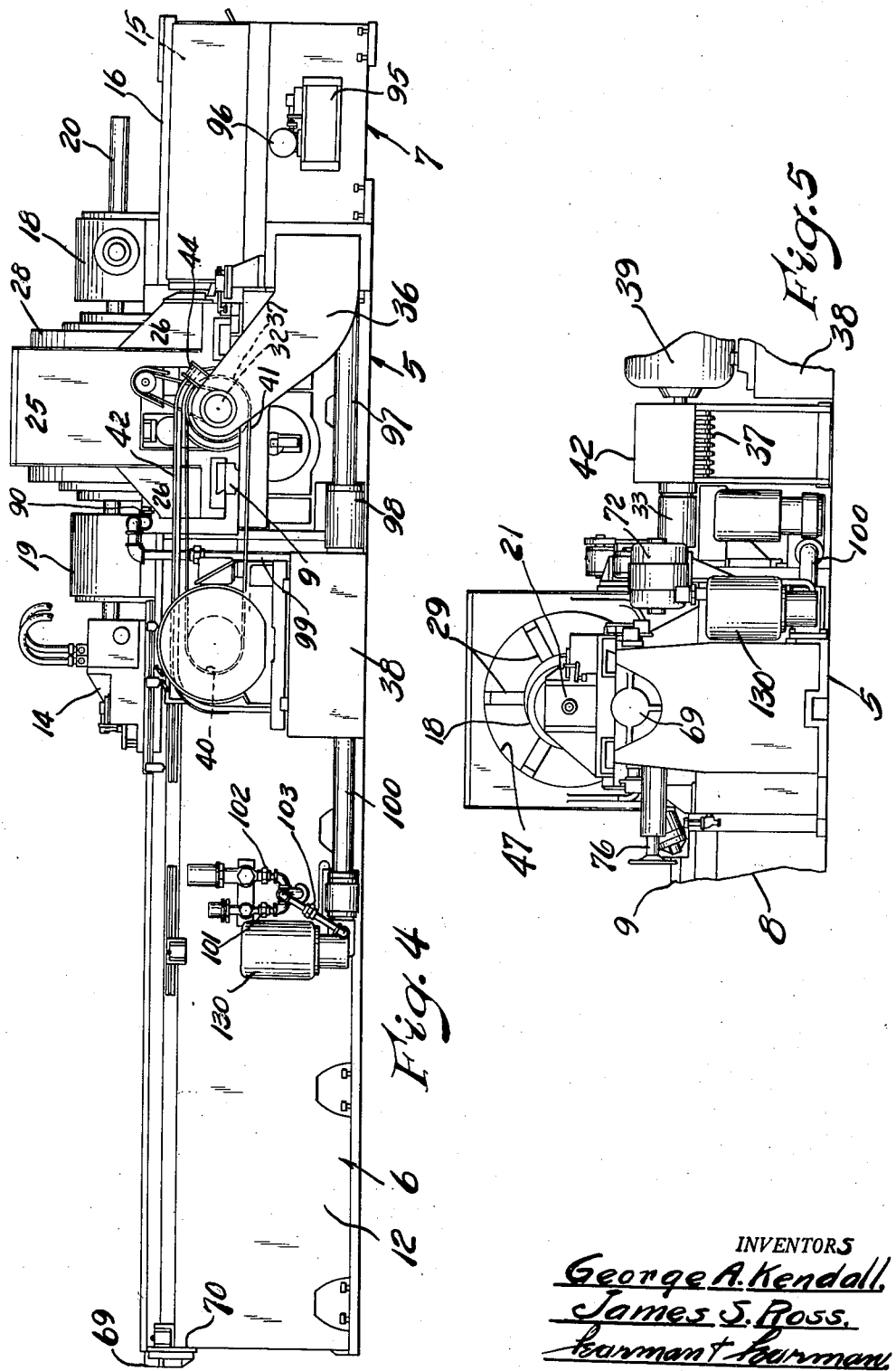

Jan. 6, 1959 G. A. KENDALL ET AL 2,867,138
CENTER DRIVE BORING MACHINE
Filed May 21, 1953
5 Sheets-Sheet 4
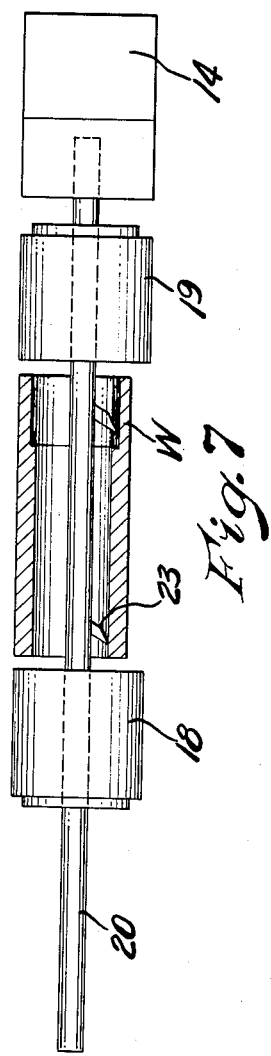
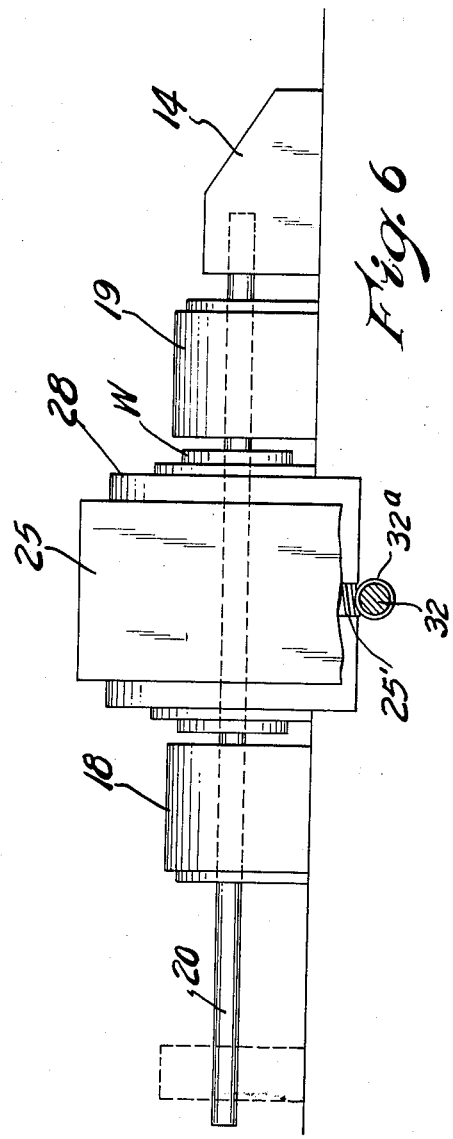
INVENTORS
George A. Kendall
James S. Ross
BY Fearman & Fearman
ATTORNEYS

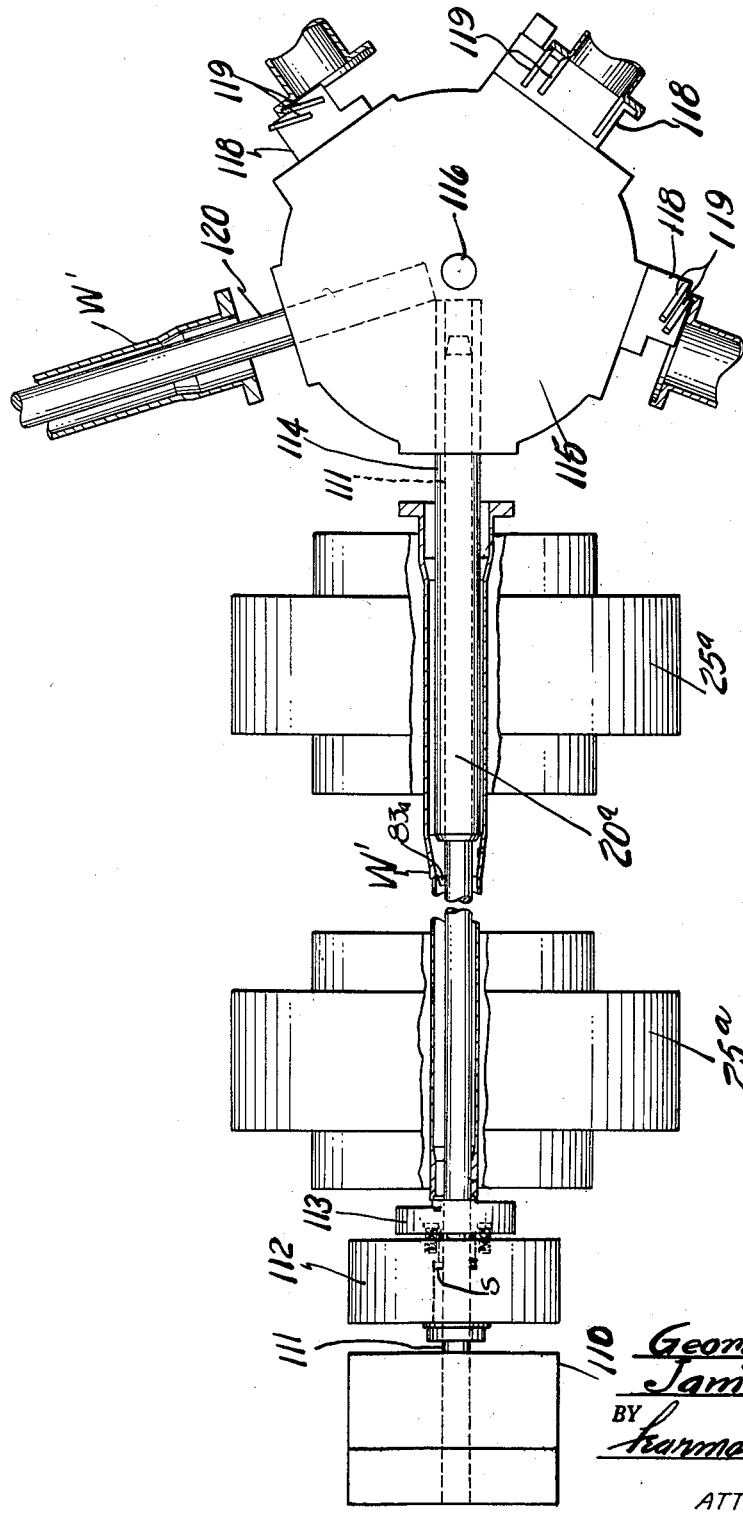

United States Patent Office 2,867,138
Patented Jan. 6, 1959

2,867,138
CENTER DRIVE BORING MACHINE

George A. Kendall and James S. Ross, Saginaw, Mich., assignors to Wickes Machine Tool Division of The Wickes Corporation, a corporation of Michigan Application May 21, 1953, Serial No. 356,353

8 Claims. (Cl. 77—3)

The present invention relates to improvements in machine tools, and more especially to a boring machine adapted to remove metal from the internal surface of a workpiece either in a straight line or profile contour.

One object of the invention, is to provide a machine tool in the form of a boring machine in which the work is rotated and the boring bar is fed axially to the work surface on the interior thereof during the cutting operation.

Another object, is to provide a machine tool in which the cutting member is held against rotation and fed to the interior surface of a rotating workpiece such that the cutting tool may be held against displacement, and thus enable the internal cutting of a true circular bore in said workpiece.

Another object, is to provide a machine tool having a rotary work holder mounted on a cross-slide and a cutting member mounted on a bar extending axially of the work holder and supported at opposite ends to thus enable cylindrical workpieces to be internally machined accurately and without chatter or vibration of the tool during the cutting operation.

Another object, is to provide a machine tool having a cutter bar which is fixed against rotation but is movable longitudinally so as to be fed to the rotating work which is mounted on a cross-slide and arranged such that the ends of the cutting bar are supported against movement in a lateral direction to thus increase the accuracy of the finished workpiece and permit internal bores to be formed in blanks which are the same diameter throughout their length.

Another object, is to provide a machine tool such as a boring machine or the like having a boring bar which is held against rotation and movable axially to feed the cutter to a workpiece supported in a rotatable carrier on a cross-slide, and to provide quick traverse feed mechanism for the boring bar and cross-slide as well as adjustable pressure fluid feed means adapted to be controlled by suitable limit valves.

Another object, is to provide a machine tool of the above-mentioned type having a coolant supply for the cutting tool which is presented to one end of the workpiece bore to cause the coolant fluid to flow in a direction toward the opposite end, thus permitting cuttings to be drained into a conventional coolant tank where they fall to the bottom of the tank and can be conveniently removed from time to time without necessitating cessation of machine tool operation.

Another object, is to provide a machine tool having a separate coolant supply through suitable passageways in the boring tool for directing a coolant liquid directly onto the internal work surface and thus dissipate heat created by the cutting action, and enabling greater cutting speeds to be attained.

Another object, is to provide a modified boring machine in which the boring bar is supported on a turret which is fed axially to the work, and to provide said turret with a series of fixed cutters arranged in circumferentially spaced apart relation on the turret so that the turret may be fed to the work to present such cutting elements as facing and recessing tools to the work at the end thereof after the internal surface has been machined.

Another object, is to provide a machine tool such as a boring machine or the like in which the feeding of the boring bar in an axial direction can be controlled by adjustable stop members, and similarly the cross-slide can be automatically controlled to provide infeeding at certain intervals and thus produce profiles of either irregular or definite contour.

Another object, is to provide a machine tool in the form of a boring machine in which the workpiece is chucked in the rotary work holder at both ends thereof by radially movable chuck jaws, certain of which are adapted to grip the work for centering purposes while the remaining jaws engage the work to effectively hold the workpiece in the centered position and prevent relative movement in the work holder.

Another object, is to provide a boring machine in which the cross-slide can be laterally displaced to permit quick and easy loading after the boring bar has been retracted by the quick traverse mechanism.

Another object, is to provide a machine tool such as a boring machine in which the cutting tools are mounted on the boring bar to extend radially in a direction toward the operator so that the metal cuttings or chips will fall down and in a direction away from the operator, rather than in a direction toward the operator during the cutting operation.

Another object, is to provide a machine tool such as a boring machine or the like which can be operated either automatically or mechanically to produce production or precision work.

Other objects and advantages of the invention will become apparent during the course of the following description of the accompanying drawings, wherein:

Figure 1 is a front elevational view of the machine tool showing the manner in which the boring or cutting bar is mounted on a slide to move into and out of its operative position and be supported at both ends when in cutting relation with the rotary workpiece.

Figure 2 is an end elevational view of the machine tool showing the manner in which the rotary work holder is mounted on a cross-slide and arranged so that the cutting tool may cut an internal surface in the workpiece depending upon the transverse movement of the cross-slide.

Figure 3 is a top elevational view of the machine tool showing various features such as the drive shaft for the rotary work holder and the arrangement of the supporting bushings for the cutting tool supporting bar on each side thereof.

Figure 4 is a rear elevational view of the machine tool showing the manner in which the work holder is mounted on a cross-slide with the non-rotatable cutter bar in its operative position and supported at each end in suitable bushings on opposite sides or ends of the workpiece.

Figure 5 is is an end elevational view illustrating a fragmentary portion of the machine tool and showing the cross-slide and rotary work holder carried thereby displaced from the axis of the non-rotary cutting bar to illustrate one of the many degrees of eccentricity which can be attained by suitably adjusting the cross-slide depending upon the depth of cut to be taken in the internal work surface.

Figure 6 is a fragmentary side elevational view illustrating diagrammatically the manner in which the cutting or boring bar is supported adjacent its ends when in its operative position to thus prevent chatter and prevent lateral displacement of the cutting tool as it approaches various distances between the ends of the workpiece.

Figure 7 is a fragmentary top elevational view similar to Figure 6, and showing the relation of the workpiece to multiple cutters on the cutting bar in a position in which the boring bar has almost completed a roughing operation, and Figure 8 is a fragmentary top elevational view of a modified form of the invention in which the principles thereof are embodied in a double end machine, a non-rotatable boring bar being fed from the left end of the machine with its outer end supported by a tubular support bar mounted in a turret slide on the right side of the machine. The turret head which is movable axially with respect to the work is shown provided also with a boring tool and facing tools.

Fig. 9 is a fragmentary, end elevational view illustrating the means for actuating the cross slide.

In the drawings, and more in detail, attention is directed to Figures 1 to 4 inclusive, wherein the reference character 5 will generally be employed to designate a centralmost machine tool bed frame, and the reference characters 6 and 7 will likewise generally designate end machine tool frames arranged on opposite sides of the central frame 5. The central frame 5 includes a casting 8 providing a machine tool bed having the sides and ends fabricated and secured together in any well known manner such as by threaded fasteners or the like. The bed frame 8 is provided in its top surface with a pair of parallel ways 9 of conventional construction to accommodate a cross-slide 10.

The machine frame 6 is similarly formed of fabricated structural elements to provide a machine tool bed 12 which is of considerable length and is provided in its top surface with spaced parallel ways 13 adapted to provide a guideway for slidably receiving a tool bar supporting slide 14. The end frame 7 is also formed of fabricated structural elements to provide a bed frame 15 having sides, ends, top and bottom walls to provide an enclosed coolant reservoir and sludge tank. The top wall 16 of the end frame or bed 7 is provided with a casting 18, and similarly the top wall of the bed frame 6 is provided with a casting 19. The castings 18 and 19 are adapted to form supporting bearings for a cutting tool bar 20 having one end secured in a housing 21 on the slide 14. Thus, as the slide 14 is moved to and fro the cutting or boring bar 20 which is fixed in the housing 21 will be supported adjacent its ends by a suitable machined bushing in each of the castings 18 and 19. The castings 18 and 19 are provided with suitable flanges securely bolted in place on the top surfaces of the machine tool bed frames 6 and 7.

Mounted on the cross-slide 10 is a large cylindrical housing 25 which is reinforced by integrated webs 26 connecting the slide and housing 25. Rotatably mounted in the housing 25 is a chuck body 28 of cylindrical form and providing a support for two sets of radially movable chuck jaws 29 and 30 on the right and left hand ends of the cylindrical chuck body 28 respectively. The central portion of the cylindrical chuck body 28 is provided in its periphery with gear teeth to form a worm wheel 25' (see Fig. 6) which is adapted to provide a suitable drive mechanism which will be hereinafter more fully described. The operating mechanisms for the chuck jaws 29 and 30 may include the usual scroll or screw actuator commonly employed in conventional chucks of the radial gripping jaw type. One of the sets of chuck jaws such as 29 may embody at least 6 radially movable gripping jaws with three or more acting as centering jaws, while the remaining jaws combine to produce an increased chucking action for a cylindrical piece of work.

Journaled in the lower portion of the slide 10 is a drive shaft 32 which is fitted on its inner end with a worm 32a in driving engagement with the aforementioned worm wheel on the chuck body 28, and said drive shaft 32 is supported for both rotatable and sliding movement in a bearing 33 secured to the upper surface of the central machine tool bed 8 by means of a suitable bearing support 34. In addition, the drive shaft 32 is supported for rotatable and sliding movement in a bearing 35 mounted on the end of an angle shaped bracket 36 which has its other end secured to the end machine frame 5 by bolts or the like (not shown). A drive pulley 37 is mounted on the drive shaft 32 and is positioned between the bearings 33 and 35 and is keyed or otherwise affixed to the shaft to rotate therewith. The pulley 37 is of the multi-V groove type used in conventional power drives.

A motor base 38 is mounted on the floor in back of the machine tool for supporting an electric motor 39 having a grooved pulley 40 which is drivingly connected to the grooved pulley 37 by means of a series of endless V-belts 41. A belt housing 42 is supported at one end as at 43 adjacent the motor base 38, while the other end is supported by a bracket 44 having one end offset as at 45 and secured to the bearing casting 35. It will thus be seen, that energization of the motor 39 from a suitable source of electrical energy will rotate the shaft 32 and through the worm and worm wheel gearing (not shown) will drive the chuck body 28.

The chuck body 28 is anti-frictionally mounted in the bore 47 of the casting 25 by roller or ball bearings adjacent each end thereof, and mounted in suitable external and internal raceways in the chuck body 28 and chuck body housing casting 25.

The electric motor control may be of any type desired, and the motor is preferably of the variable speed type which can be controlled to produce the required number of revolutions per minute of the chuck body depending upon the cutting speed governed by the workpiece.

In order to traverse the cross-slide 10, there is provided a splined shaft 50 which has one end journaled in a bearing 51, and the other end journaled in a bearing 52 in a bracket 53 secured to the end of the center bed frame 5. The splined shaft 50 (see Fig. 9) is provided on its inner end with a plunger 54 which is reciprocable in a hydraulic motor 55. A screw actuator 56 is fixed on the shaft 50 interjacent its ends and has threaded engagement with a nut 57 which is in driving engagement with suitable gearing beneath the ways 9 so that when the shaft 50 is rotated, the slide 10 will move to-and-fro across the axis of the boring bar 20. An extension 58 on the bracket 53 is provided with a hand control 59 to operate the splined shaft 50 independently of the fluid motor 55 in order to adjust the cross-slide 10 to various positions of eccentricity with relation to the boring or cutting bar 20. The fluid motor 55 is controlled to rapidly traverse the slide 10 to and from loading and unloading position, and also to feed the slide 10 to make taper and profile cuts. The hand control 59 can be used to adjust the axial position of the work relative to the tool independently of the motor 55 or, of course, to perform any traversing function manually if desired.

The fluid motor 55 is connected to a suitable source of pressure fluid (not shown) having control valves 60 and 61 mounted on the end frame or bed 7 in spaced-apart relation, (see Fig. 3). A projection or arm 62 is mounted on the slide 10 at the rear thereof, and is provided with adjustable detents 63 and 64 which may be adjusted along the arm 62 so as to engage valve plungers in the valves 60 and 61. Thus, for limited adjustments, the valves 60 and 61 may be actuated by the detents 63 and 64 to control the movement of the slide 10 within a small range of displacement which would be required to displace the cutting tool from engagement with the work when the boring or cutting bar 20 is being retracted after a cut has been made and it is desired to re-load the chuck holder or casing 28. The pressure fluid lines and pressure fluid reservoir have been omitted for the purpose of clarity.

The cutting tool or bar has one of its ends mounted in a housing 65 on the slide 14, while the opposite end is adapted to project through the bushing housing 18 when the machine tool is in operation. A screw and nut traverse mechanism is provided for the cutting or boring bar supporting plate 14 and includes a screw shaft 68 having one of its ends journaled in a bearing casting 69 supported at one end of the right hand machine tool bed 6 by means of a bracket 70. The inner end of the screw shaft 68 is journaled in bearings in a gear box (not shown) in the bed of the machine. A feed nut is provided within the slide 14 and the screw shaft 68 has threaded engagement therewith to cause the slide 14 to move to-and-fro when the shaft 68 is rotated.

In order to provide a quick traverse for the slide 14, an electric motor 72 is mounted on the bed of the machine, and has its armature shaft 73 extending into the gear box (not shown) through which the threaded shaft 68 is actuated. Thus, when the motor 72 is energized by being connected to an electrical source of energy, the shaft 68 will be quickly rotated and the slide 14 will be moved rapidly along the ways 13 to project or retract the cutting or boring bar 20.

A hydraulic motor or the like as at 75 is mounted on the bed of the machine and is adapted to be connected to a suitable source of pressure fluid in order to feed the slide 14 during the cutting operation. A manual control 76 is also provided for actuating the shaft 68 in order to adjust the position of the cutter on the boring bar 20 along the internal surface of the workpiece. Limit switches 78 and 79 are provided along the side of the machine tool frame or bed 6 and are adapted to be engaged by projections, one of which is shown at 80 in Figure 3, on the slide 14 and thus control the energization of the motor 72. Thus, the switches 78 and 79 limit the to-and-fro movement of the rapid or quick traverse so that the cutting tool can be retracted or projected during the loading and unloading of the work holding chuck 28.

It is to be noted that the bushings in the housings 18 and 19 are cut away as at 82 to permit the cutting tool 23 (Fig. 7) on the boring bar 20 to pass through the bushing opening 84 (Fig. 2) during the projection and retraction of the cutting or boring bar 20. Since the boring bar 20 is fixed against rotation, the cutting tool 23 which is presented in a direction toward the front of the machine will clear the slot or cut away portion 82. The work W (Fig. 7) is supported by the chuck jaws 30, and when said chuck housing 28 is rotated the work W will be rotated so that the inner periphery will move about the cutting element 23 and remove metal from the internal surface as desired, the depth of cut being determined by the degree of eccentricity between the cutting tool 23 and the work W which is a result of the adjustment of the rotary work holder 25.

The cutting tool 23 will direct the chips downwardly when the rotary chuck housing 28 is rotated in a counter-clockwise direction as viewed in Figure 2. In order to remove the shavings and chips from the internal surface of the workpiece W and to dissipate the heat therefrom created by the cutting action, a jet 90 is supported above the central machine bed 5 and is presented in a direction so that the chips will be removed from the workpiece and forced out of the opposite end where they will fall into a trough T and be conveyed from the discharge 91 of the trough down an inclined screen plate 92. The chips and sludge thus are collected on the screen 92 from whence they may be removed and the coolant drains down therethrough to the bottom of the tank 15. The collected coolant oil or fluid is then re-circulated by means of a pump 95 which is operated by an electric motor 96 and has its intake in communication with the coolant liquid in the tank 15 at a level above the sludge line. The discharge or exhaust of the pump 95 is through a pipe 97 (see Fig. 4) to a manifold structure 98 to which is connected a pipe 99 extending upwardly to the jet 90.

In order to provide an independent source of coolant supply directly to the cutting tools, the manifold casting 98 is connected to a pipe 100 which extends along the back of the machine tool and to the intermediate portion of the end machine frame bed 6. The pipe 100 is connected to branch pipes 101 and 102 by means of a pipe and coupling 103, and said branch pipes have connected thereto a pair of flexible fluid conductor pipes 104 which extend into a manifold casting 105 on the slide 14. Pipes 106 and 107 connect the manifold structure 105 to the interior of the boring tool or bar socket 65 to supply cooling lubricant through axial and lateral passages in the boring bar 20. The lateral passages are preferably disposed adjacent the cutting tools 23 so as to direct a jet of cooling liquid such as coolant oil or the like onto the cutting tools and thereby dissipate the heat generated by the cutting action.

The sets of chuck jaws 29 and 30 may be actuated by a small electric motor 108 carried on the rear of the chuck housing 25 and suitable gearing is provided (not shown) for actuating the chuck jaws when the motor is energized to cause its armature to rotate in either direction.

In the modified form of the invention illustrated diagrammatically in Figure 8 of the drawings and in which we have adapted the principles of the invention to a double end machine, a pair of chuck housings 25a is provided on the cross slides 10 (not shown in this figure). Each chuck housing 25a is provided with suitable chuck jaws adjacent the ends thereof which are operable to grip a workpiece W' of more than one diameter dimension. Longitudinally disposed ways (not shown) are provided on the left end of the machine as well as on the right side thereof and a slide 110 is mounted thereon and has a boring bar 111 fixed therein. Suitable means (not shown) are provided for feeding the bar 111 during the cutting operation and for rapidly traversing the bar into and out of cutting operation. A bearing 112 mounted on the bed of the machine supports the bar 111 and is provided with a facing cutter 113 which is normally in spring-retracted position out of engagement with the end of the workpiece W', but which in Fig. 8 has been engaged by a shoulder S on the boring bar and moved into cutting engagement with the work.

The boring bar 111 is provided with a cutting blade 83a which is shown completing a cut. A support sleeve 114 into which the inner end of the bar 111 extends, is held rigidly in a turret head 115 which is mounted on the slide 14 as shown in the form of the invention in Figs. 1 to 8 inclusive. The slide is simply modified to provide a short spindle 116 on which the turret head is mounted to revolve and is locked in a conventional manner. The various tool holding faces of the turret head 115 are provided with adjustable blocks 118 having recessing and facing cutters 119, as well as finishing cutters. Also, one or more of the turret head stations may be provided with a boring bar 120 having cutting tools thereon for operating upon certain internal diameters when the bar 111 is not being used as in the embodiment of Figs. 1–7.

In both embodiments of the machine, it is important to note that tapered internal surfaces can be cut and profiling cuts can be taken by simply feeding the cross-slide 10 relative to the axis of the bar 20 or 111 according to mechanically, hydraulically, or electrically controlled templates. During any cutting operation, the bar is at all times supported at both ends against deflection in any direction and extremely accurate cuts can be taken. An alternative method of cutting tapered internal surfaces is to dispose the chuck housings 25a at a slight angle of predetermined degree relative to the slide 10 so that the workpiece will be held and rotated at an angle to the cutting tool as the same is fed along the internal surface thereof.

The coolant system may be provided at intervals with strainers or the like as at 130 in the system for the jet 90.

It is to be understood that the forms of the invention herewith shown and described are to be taken as preferred embodiments thereof, and that various changes in the shape, size and arrangement of parts may be resorted to without departing from the spirit of the invention or the scope of the subjoined claims.

What we claim is:

1. In a boring machine tool, a rotary work holder, a tool bar having a cutting tool thereon intermediate the ends of said bar, means for moving said bar to cause movement of said tool axially through said work holder and a workpiece, means for feeding said work holder transversely of the axis of said cutting tool to permit profiling cuts to be taken in the internal diameter of the workpiece, means for supporting opposite ends of said bar during cutting operations, means for rotating said work holder, and means for rapid traversing said workholder transversely to permit movement thereof outwardly to a position in which the holder may be loaded and unloaded.

2. In a boring machine tool, a bed frame having longitudinal and transverse ways, a boring bar mounted to move on said longitudinal ways, a rotary work holder mounted to move on said transverse ways, said boring bar being arranged to extend through said work holder, means for rapidly traversing said boring bar to and from the position in which it extends through said work holder, means for moving said boring bar along said longitudinal ways to feed said boring bar to a cylindrical workpiece during internal cutting, means for feeding said work holder along said transverse ways to permit the taking of profiling cuts, for rotating said work holder, and means for rapid traversing said workholder on said transverse ways to permit movement thereof outwardly to a position in which the holder may be loaded and unloaded.

3. In a boring machine tool, a machine frame having longitudinally and transversely extending ways, said transverse ways extending from said longitudinal ways a slide on each of said ways, a rotary work holder carried by the slide on said transverse ways, a boring bar carried by the slide on said longitudinal ways and arranged to project through said work holder, means for rotating said work holder, and separate and independently operable means for moving each of said slides along its respective ways to feed said boring bar and adjust the depth of cut and means for rapidly traversing each of said slides along its respective ways to and from cutting positions of the latter.

4. In a boring machine tool, a bed frame including a central portion and end portions, longitudinal ways on one of said end portions, a boring bar supported for movement along said ways, transversely extending ways on said central portion, a rotary work holder mounted for movement along said transverse ways, work gripping jaws carried by said work holder adapted to receive a cylindrical workpiece through which said boring bar is adapted to project, bushings on the end frames for supporting each end of said boring bar on opposite sides of said holder, quick traverse means for actuating the boring bar and work holder along their slides, means for rotating said work holder, manual means for adjusting the boring bar and work holder along their ways, pressure fluid means for feeding said boring bar, means for controlling the feeding movement of said boring bar, and means for operating said work gripping members.

5. In a boring machine tool, a bed frame, longitudinal ways on said bed frame, a slide mounted on said ways, a boring bar carried thereby, a turret mounted on the opposite end of said bed frame having a plurality of stations at least one of which mounts a sleeve therein for supporting the end of said boring bar, a work holder for gripping a cylindrical workpiece through which said boring bar extends, means for rotating said work holder, means for moving said work holder transversely of the boring bar axis, and means for moving said slide toward and away from said work holder.

6. In a boring machine tool, a bed frame having longitudinal and transverse ways, a pair of rotary work holders movable in unison along said transverse ways, means carried by said work holders for gripping a cylindrical workpiece at spaced apart locations, means for rotating said work holders, a turret head rotatably mounted on said longitudinal ways and having a plurality of stations at least one of which carries, a boring bar which is adapted to extend through the workpiece and be supported at the opposite end thereof, certain other of said turret head stations being provided with recessing and facing cutters for operating upon the end of the workpiece, means for moving said turret head along said ways, and means for moving said rotary work holders transversely to enable profiling cuts to be taken when the boring bar is in its operative position.

7. In a boring machine tool, a bed frame having longitudinally disposed ways on the ends thereof, transverse ways on said bed frame centrally thereof, a rotary work holder mounted on said transverse ways, a slide mounted on said longitudinally disposed ways at one end of said machine, a boring bar carried thereby and extending through said workholder, a turret slide mounted on said longitudinally disposed ways at the opposite end of the bed frame and having a plurality of stations at least one of which mounts a support sleeve for the boring bar, said sleeve extending into the work piece, and means for rotating said work holder.

8. The combination defined in claim 7 in which a support is provided adjacent one end of said bed frame through which said boring bar extends and a facing tool mounted on said support and movable into engagement with the end of the work piece when the boring bar is completing its cut.

References Cited in the file of this patent

UNITED STATES PATENTS

| | | |
|---|---|---|
| 619,450 | Turton | Feb. 14, 1899 |
| 635,888 | Hartness | Oct. 31, 1899 |
| 1,856,185 | Guild | May 3, 1932 |
| 1,856,846 | Duncan | May 3, 1932 |
| 2,007,953 | Barnes et al. | July 16, 1935 |
| 2,385,430 | Von Zelewsky et al. | Sept. 25, 1945 |
| 2,424,524 | Weimar | July 22, 1947 |
| 2,429,830 | Ljunggren | Oct. 28, 1947 |